July 2, 1957

L. K. IRWIN 2,797,494

APPARATUS FOR TESTING THE ADJUSTMENT OF
AUTOMOBILE HEADLAMPS

Filed Nov. 3, 1955

INVENTOR
Lee K. Irwin

BY Burns, Doane, Benedict & Irons

ATTORNEYS

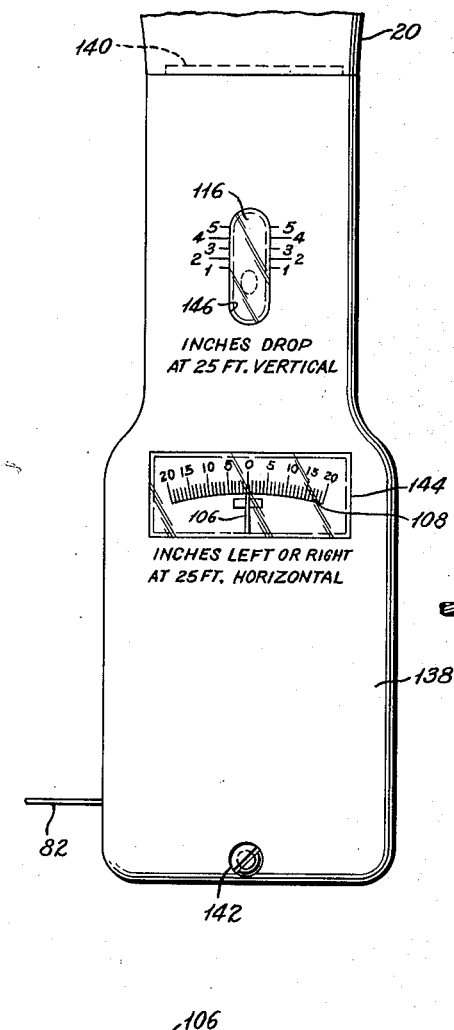
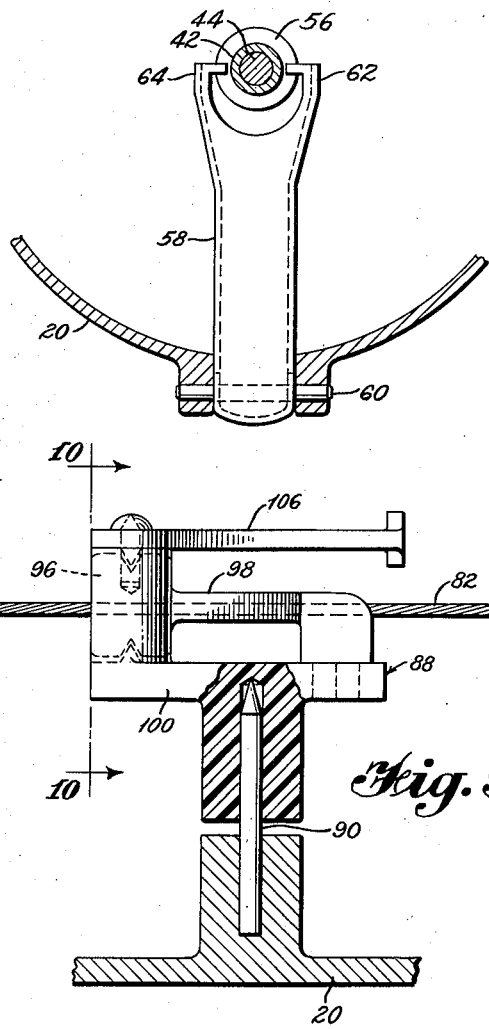
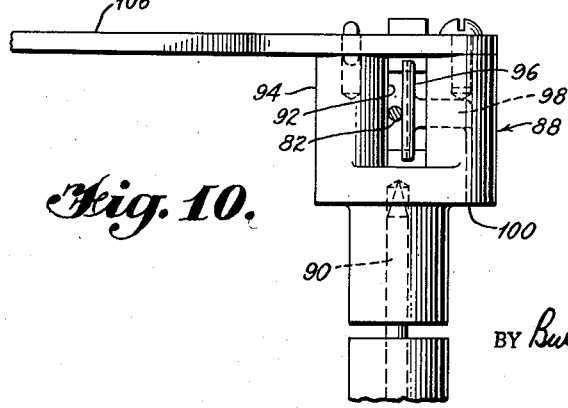

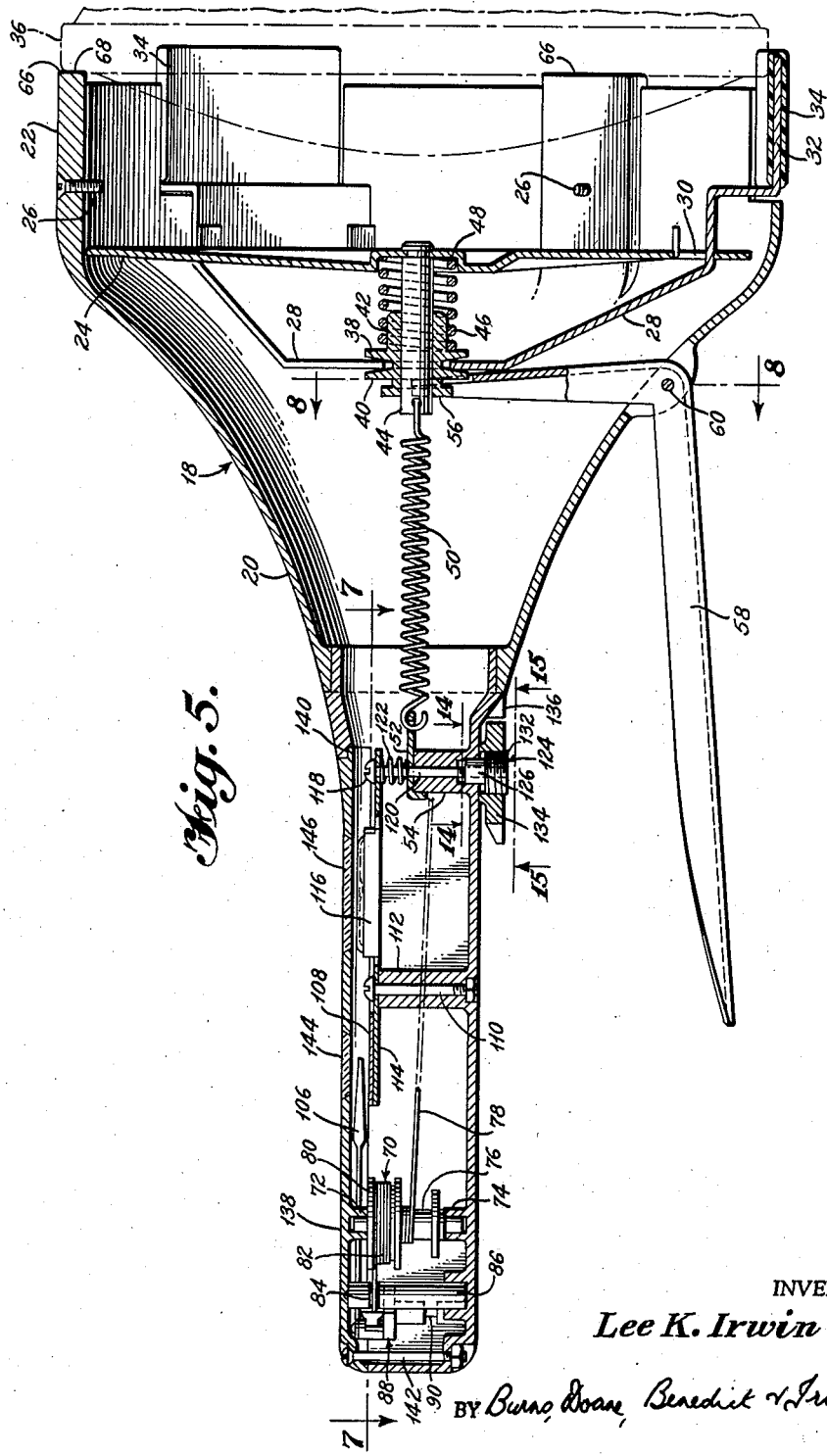

July 2, 1957 — L. K. IRWIN — 2,797,494
APPARATUS FOR TESTING THE ADJUSTMENT OF AUTOMOBILE HEADLAMPS
Filed Nov. 3, 1955
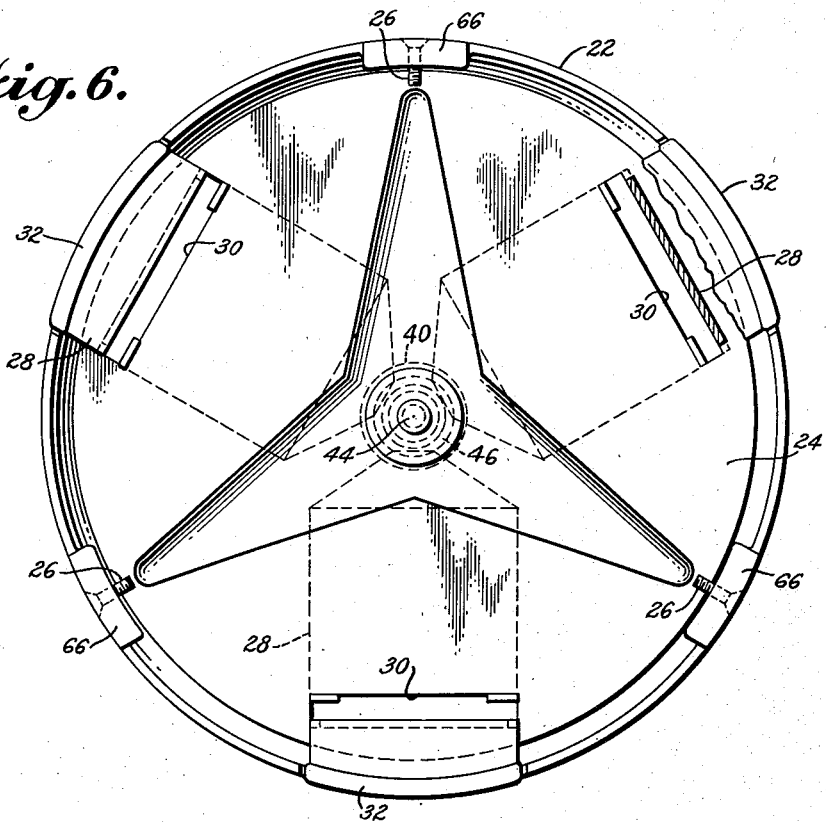
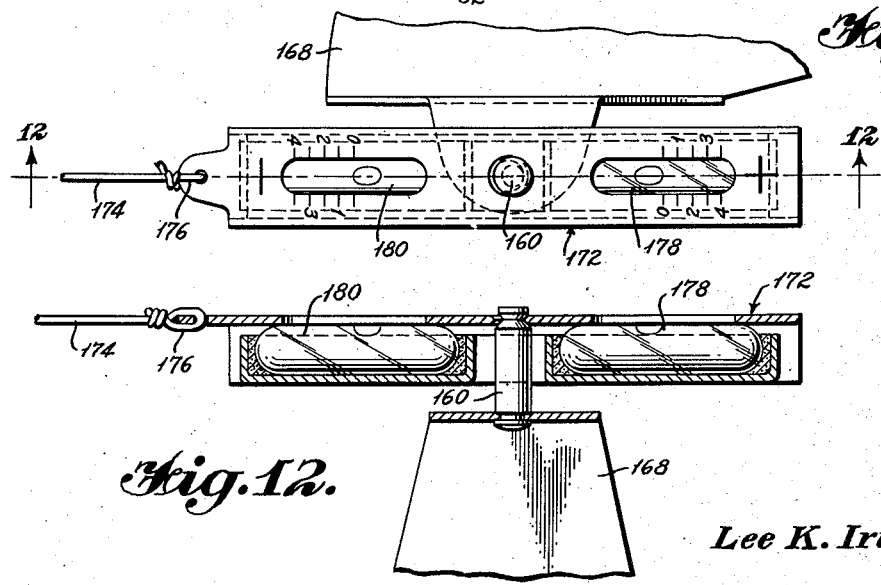
INVENTOR
Lee K. Irwin
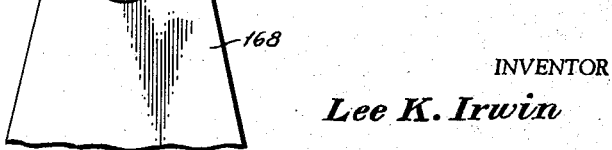
ATTORNEYS

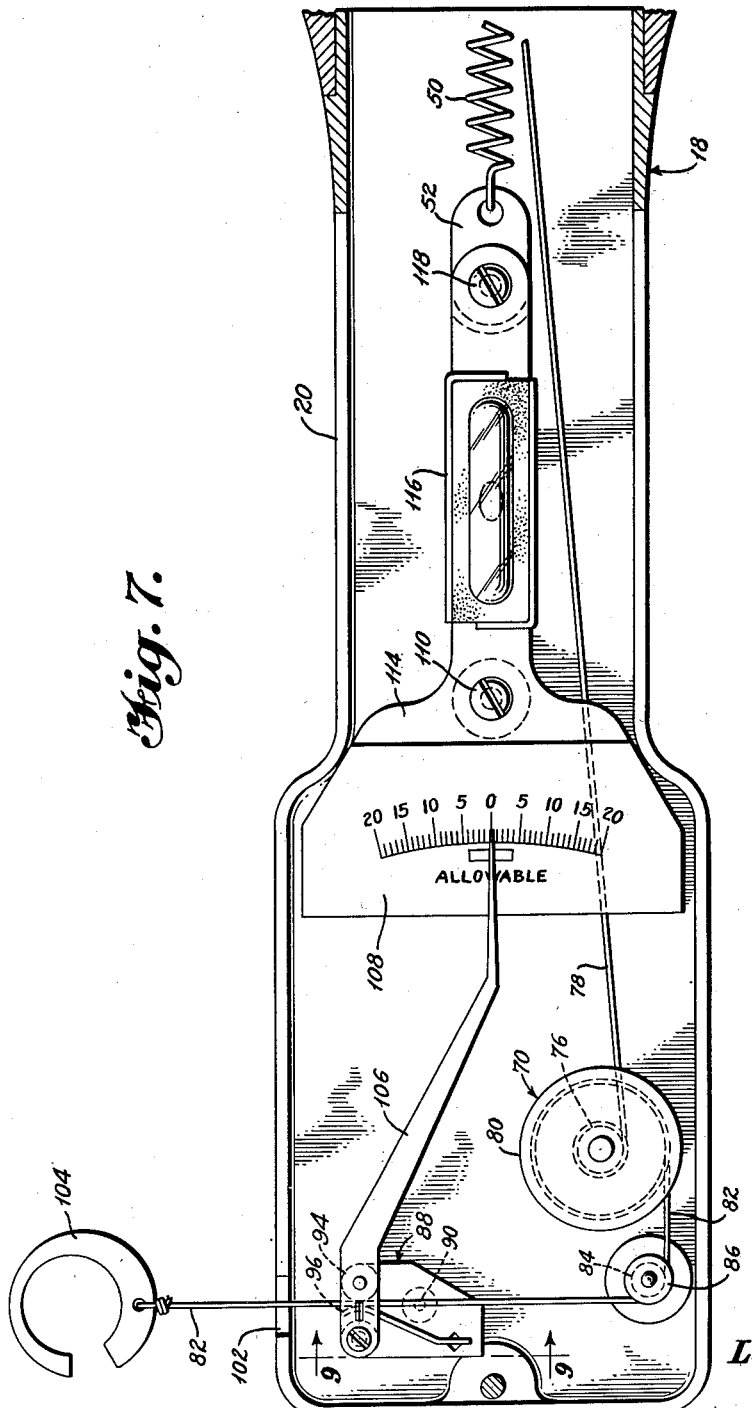

July 2, 1957
L. K. IRWIN
2,797,494
APPARATUS FOR TESTING THE ADJUSTMENT OF
AUTOMOBILE HEADLAMPS
Filed Nov. 3, 1955
6 Sheets-Sheet 6
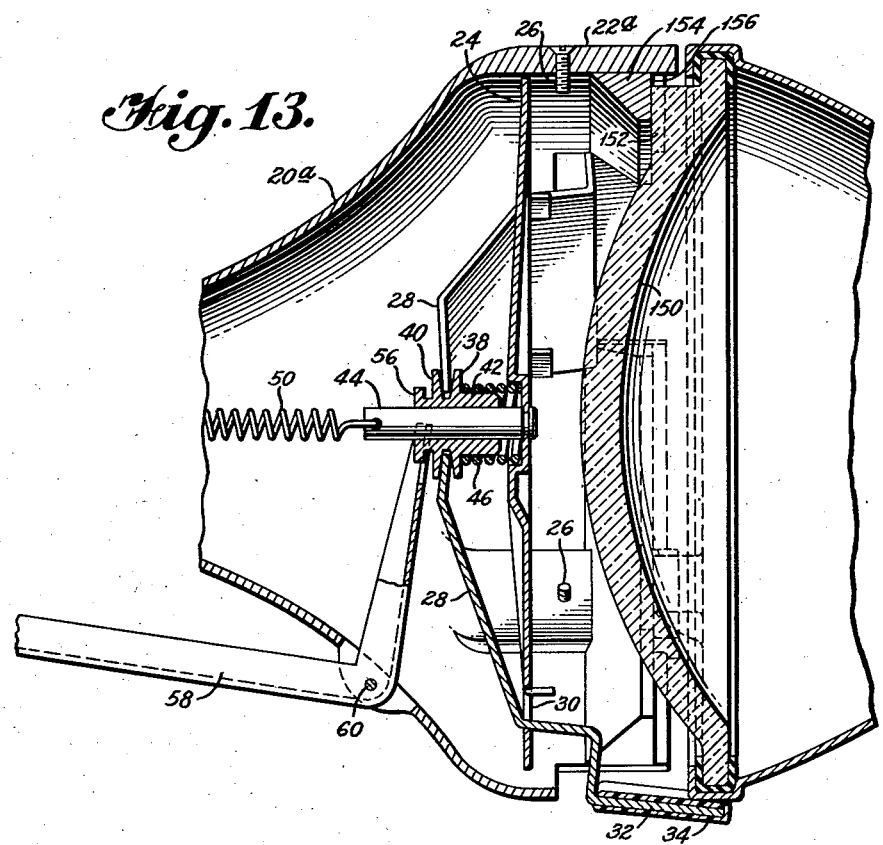
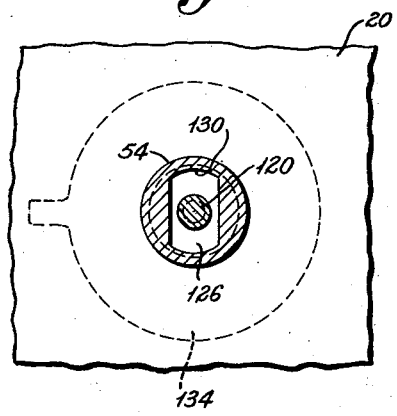
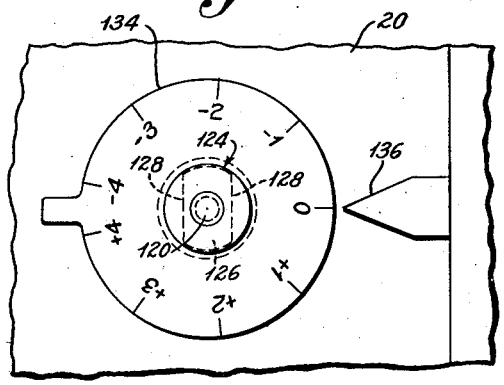
INVENTOR
*Lee K. Irwin*
BY *Burns, Doane, Benedict & Irons*
ATTORNEYS ited States Patent Office 2,797,494
Patented July 2, 1957

2,797,494

APPARATUS FOR TESTING THE ADJUSTMENT OF AUTOMOBILE HEADLAMPS

Lee K. Irwin, Emporia, Kans., assignor to Hopkins Manufacturing Corporation, Emporia, Kans., a corporation of Kansas Application November 3, 1955, Serial No. 544,646

14 Claims. (Cl. 33—180)

The present invention relates to apparatus for testing the adjustment of automobile headlamps. More specifically, the invention relates to improvements in the type of automobile headlamp adjusting apparatus in which units are attached to each headlamp in properly oriented position with respect to the beam of the headlamp and the positions of those units relative to each other and relative to the longitudinal axis or direction of travel of the automobile are determined as an indication of the adjustment of the headlamps.

One of the primary objects of this invention is to provide members of the type described above which can be readily attached to automobile headlamps and in which there is assurance that the members will be accurately oriented with respect to the beams of the headlamps.

Another object of the invention is to provide a pointer and dial from which can be directly read the deviation of the beams of the headlamps from lines parallel to the longitudinal axis or direction of travel of the automobile. In connection with this object of the invention, it is to be noted that the invention provides for relatively large movement of the pointer over the dial so that the adjustments can be easily made with accuracy.

Still another object of the invention is to provide apparatus of the type described which can be used in spite of the fact that the automobile is not resting on a level or horizontal surface.

Another object of the invention is to provide apparatus of the type described which can be used in testing headlamps of different types.

Other objects and advantages of the invention are mentioned in the following description which has reference to the accompanying drawings wherein:

Figure 4 is a top plan view of the forward end of one of the units of the apparatus;

Figure 5 is a longitudinal, vertical sectional view of one of the units;

Figure 6 is a rear end elevational view of the unit shown in Figure 5;

Figure 7 is a horizontal sectional view taken in the direction of the arrows along the line 7—7 of Figure 5;

Figure 8 is a vertical sectional view taken in the direction of the arrows along the line 8—8 of Figure 5;

Figure 9 is an enlarged vertical sectional view taken in the direction of the arrows along the line 9—9 of Figure 7;

Figure 10 is a view taken in the direction of the arrows along the line 10—10 of Figure 9;

Figure 11 is an enlarged top plan view of a portion of the apparatus shown in Figure 2;

Figure 12 is a horizontal sectional view taken in the direction of the arrows along the line 12—12 of Figure 11;

Figure 13 is a longitudinal, vertical sectional view of a portion of a unit which constitutes a modified form of the invention;

Figure 14 is a horizontal sectional view taken in the direction of the arrows along the line 14—14 of Figure 5; and Figure 15 is a view taken in the direction of the arrows along the line 15—15 of Figure 5.

Figure 1:
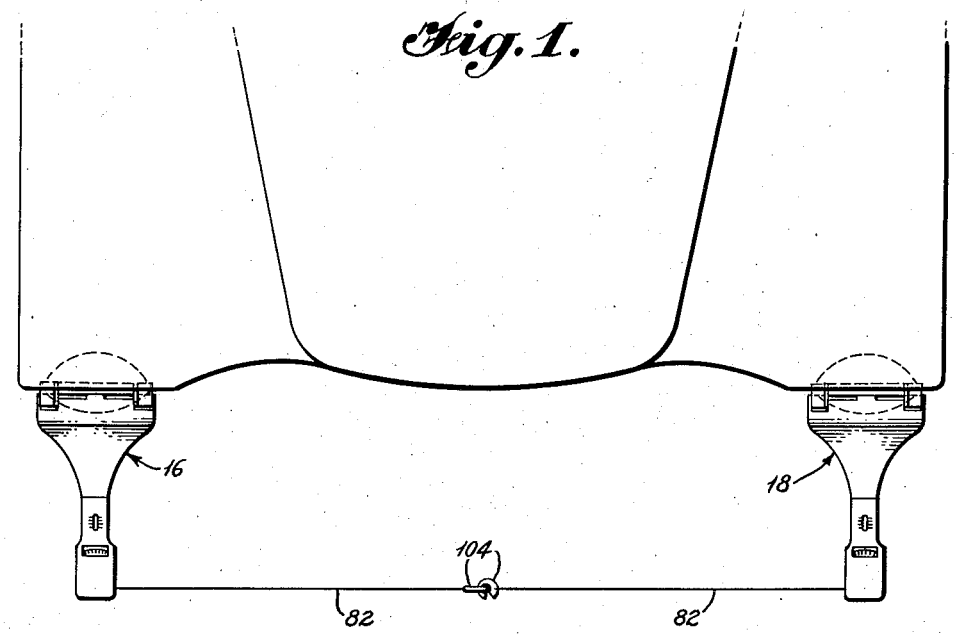
Figure 1 is a top plan view of the front portion of an automobile, showing the apparatus of the invention attached to the headlamps thereof.
Figure 2:
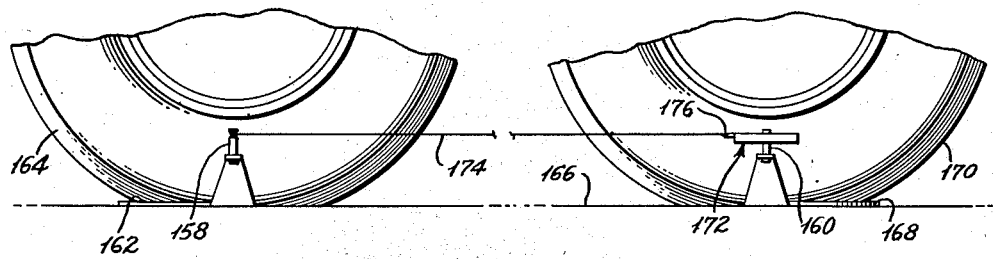
Figure 2 is a side elevational view showing apparatus for ascertaining the inclination of the floor or surface on which the automobile is resting.
Figure 3:
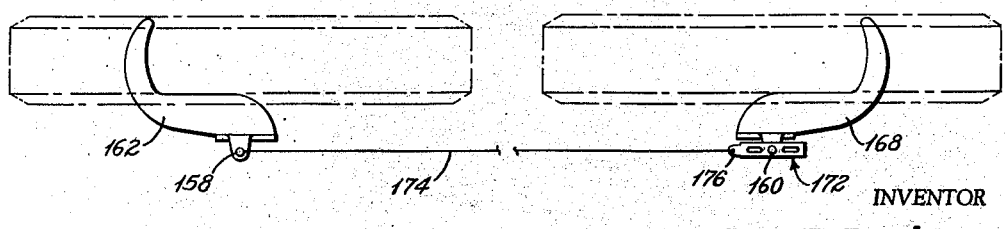
Figure 3 is a top plan view of the apparatus shown in Figure 2.

The apparatus as shown in Figure 1 includes a pair of units designated generally by the reference numerals 16 and 18. It will be understood that the units 16 and 18 are identical except for the fact that one of the units is arranged to be attached to the right headlamp of an automobile, while the other unit is arranged to be attached to the left headlamp. It will therefore be sufficient to describe in detail only the unit 18.

The details of the unit 18 are best shown in Figure 5. An elongated body or housing 20 is provided with a base portion 22 of generally circular configuration. A circular plate 24 is loosely positioned within the base portion 22 and is prevented from being withdrawn from the housing by means of stop screws 26 which are circumferentially spaced about the base portion 22. Three identical clamping jaws 28 extend through slots 30 in the plate 24. The rearward ends 32 of the clamping jaws 28 extend slightly rearwardly of the rear end of the base portion 22 and are coated with rubber or other friction material 34 to enable them to more efficiently grip the periphery of the headlamp shown in dotted lines in Figure 5 and designated by the reference numeral 36. The forward ends of the clamping jaws 28 extend forwardly and inwardly and are received between the flanges 38 and 40 of a spool-like member 42. The spool-like member 42 is slidably mounted on a stub shaft 44 which is rigidly secured at one end to the central portion of the circular plate 24. The spool-like member 42 is urged forwardly from the plate 24 by means of a compression spring member 46 having one of its ends in engagement with the flange 38 and its opposite end positioned in a recess or cavity 48 in the plate 24. The stub shaft 44 and the plate 24 are resiliently urged forwardly of the housing 20 by means of a tension spring member 50 secured at one end to the stub shaft 44 and at the opposite end to a connecting member 52 which is secured to a post 54 forming a part of the housing 20. The spool-like member 42 is also provided with a flange 56. An L-shaped lever 58 is pivotally mounted in the wall of the housing 20 by means of a pin 60. Lever 58 is bifurcated as best shown in Figure 8 to provide legs 62 and 64 which are positioned between the flanges 40 and 56 on the spool-like member 42.

When the outer end of lever 58 is moved toward the housing 20 the spool-like member 42, the spring member 46 and the plate 24 will be moved rearwardly of the housing 20 until the plate 24 engages the stop screws 26. This movement results in elongation of the spring member 50. Further inward movement of the outer end of the lever 58, after the plate 24 has engaged the stop screws 26, will result in compression of the spring member 46 and outward or expanding movement of the rearward ends 32 of the clamping jaws 28. This expansion of the clamping jaws 28 causes the rearward ends 32 of those jaws to slip over and to engage the periphery of the headlamp 36. Release of the outer end of the lever 58 results in contracting movement of the rearward ends of the jaws 28 so that the entire unit is secured to the headlamp 36. The spring member 50 then causes rearward movement of the housing 20 relative to the clamping jaws and the headlamp 36 until the rearwardly facing surfaces 66 on the base portion 22 engage the rim 68 of the headlamp 36. The housing or body 20 is thus accurately oriented with respect to the beam of the headlamp 36.

A self-winding reel designated generally by the reference numeral 70 is journalled in bearings 72 and 74 in the housing 20 in a manner best illustrated in Figure 5. Reel 70 consists of a lower spool portion 76 on which is wound an elastic cord 78 having one of its ends attached to the post 54. Reel 70 also includes an upper spool 80 which is integral with the spool 76 and on which is wound a flexible cord 82 which may also be an elastic cord.

The cord 82 extends from the reel 70 into a groove 84 in a cord guide 86 which is fixed in the housing 20. A deflection member designated generally by the reference numeral 88 is pivotally mounted on the upper end of a pointed spindle 90 which is fixed to the housing 20 in the manner best shown in Figure 9. The deflection member 88 is provided with a restricted aperture or throat 92 which is defined by the inner surface of a post 94 and the free end 96 of a cantilever mounted spring member 98 which is secured at one end in the base 100 of the deflection member 88. The cord 82 extends from the cord guide 86 through the aperture 92 in the deflection member and through an elongated opening 102 in the housing 20. The free end of cord 82 is provided with a C-shaped connector member 104 to facilitate connecting the cord 82 to a similar connecting member on the corresponding cord of the unit 16.

Rigidly secured to the deflection member 88 is a pointer 106. The free end of the pointer 106 overlies a scale 108 which is fixed on the upper surface of the plate 114 hereinafter described. The pointer 106 points to "0" on the scale 108 when the cord 82 extends from the housing 20 at exactly a right angle to the longitudinal axis of the housing. It will be seen that the spindle 90 is positioned between the cord guide 86 and the aperture 92 in the deflection member 88. It will also be seen that the spindle 90 is positioned nearer the aperture 92 than it is to the cord guide 86. This positioning of these elements causes a magnification of the movement of the deflection member 88 and the pointer 106 when the outer end of the cord 82 is moved forwardly or rearwardly as hereinafter described. It will also be seen that the pointer 106 is relatively long so that the free end of that pointer partakes of considerable movement upon even slight movement of the cord 82.

The plate 114 is rigidly fixed adjacent one end to the top of the post 112 by means of the bolt 110. A spirit level 116 is fixed to the midportion of the plate 114. The rearward end of the plate 114 is engaged on its upper surface by the head 118 of a bolt 120 and on its lower surface by a compression spring member 122 which surrounds the bolt 120. The lower end of spring member 122 engages the upper surface of the connector member 52 which rests on top of the post 54. The lower end of the bolt 120 has fixed thereto a member which is designated generally by the reference numeral 124. The member 124 has a shank portion 126 with flattened surfaces 128. The shank portion 126 is reciprocable but non-rotatable within a cavity 130 in the housing 20. The member 124 is also provided with a threaded portion 132. A threaded calibrating dial 134 is threaded on the portion 132 of the member 124 and engages the exterior surface of the housing 20. Associated with the calibrating dial 134 is a pointer 136 which is preferably formed integrally with the housing 20. It will be seen that rotation of the calibrating dial 134 in one direction or the other will cause raising or lowering of the rearward end of the plate 114 to calibrate the spirit level 116 in the manner hereinafter described.

The housing 20 is provided with a removable cover plate 138 which is held in position by means of a flange 140 and a bolt and nut 142. The cover plate 138 is provided with a window 144 through which the dial 108 and the free end of the pointer 106 are visible. The cover plate 138 is also provided with a window 146 through which the spirit level 116 is visible.

A modified form of the invention illustrated in Figure 13 differs only slightly from the form described above. The same reference numerals are used to designate the parts which are identical. This form of the invention is intended for use with a recently developed type of headlamp in which the lens 150 is provided adjacent its periphery with a plurality of circumferentially spaced, forwardly facing, flat surfaces 152. After such lamps are manufactured, the optical axis of the beam of the lamp is ascertained and the surfaces 152 are appropriately ground so that all of those surfaces lie in a plane which occupies a definite position relative to the optical axis of the beam of the lamp. In this form of the invention, the base portion 22a of the housing 20a is provided with a plurality of radially inwardly extending projections 154 having flat rear surfaces 156. The projections 154 are equal in number to the surfaces 152 on the lens 150 and are spaced to abut the surfaces 152 when the unit is clamped to the periphery of the headlamp in the manner described above. This arrangement assures that the longitudinal axis of the housing 20a will be definitely and properly oriented with respect to the optical axis of the beam of the lamp.

It has been mentioned above that the apparatus of the present invention is capable of use in spite of the fact that the automobile may not be standing on a horizontal floor or surface. Figures 2, 3, 11 and 12 illustrate apparatus which can be used to ascertain the proper position of the calibrating dial 134 to compensate for any slope of the surface on which the automobile is standing. A pair of standards 158 and 160 of equal vertical height are provided for positioning adjacent a front and rear wheel of the automobile. The standard 158 is provided with a thin edged horizontally extending hook-like portion 162 arranged to rest on the surface 166 on which the automobile is standing and to be wedged between that surface and the rearward end of that portion of the tread of the rear tire 164 which is in engagement with the surface 166 on which the automobile is standing. The standard 160 is provided with a similar thin edged horizontally extending hook-like portion 168. The hook-like portion 168 rests on the surface 166 and is wedged between that surface and the forward end of that portion of the tread of the front tire 170 which is in engagement with the surface 166. A spirit level designated generally by the reference numeral 172, is mounted for universal pivotal movement on the upper end of the standard 160. An elastic cord 174 is attached to the upper end of the standard 158 and is also attached at 176 to one end of the spirit level 172. This arrangement causes the spirit level 172 to assume a position parallel to the surface 166 on which the automobile is standing.

The spirit level 172 is preferably provided with two bubble arrangements. The bubble arrangement designated by the reference numeral 178 is designated by a "+" sign and is calibrated to indicate the amount by which the surface 166 slopes upwardly. The bubble arrangement 180 is designated by the "—" sign and is calibrated to designate the amount of downward inclination of the surface 166. The calibrations on the spirit level 172 correspond to the indicia of the calibrating dial 134. In other words, if the bubble arrangement 178 gives a "+" reading of "3," the calibrating dial 134 should be turned until its indicia "+3" coincides with the pointer 136. On the other hand, if the bubble arrangement 180 has a "—" reading of "3," the calibrating dial 134 should be rotated until its indicia "—3" coincides with the pointer 136. In this manner the spirit level 116 will be properly adjusted to compensate for inclination of the surface 166 on which the automobile is standing.

The operation of the apparatus can now be briefly described. The apparatus illustrated in Figures 2, 3, 11 and 12 is first used to ascertain the proper setting for the calibrating dials 134 on the units 16 and 18. The units 16 and 18 are positioned on their respective headlamps and the connector members 104 of the cords 82 of the two units are connected together as illustrated in Figure 1. It will be understood that the cords 82 are normally wound on their respective spools 80 with the connector members 104 being positioned just outside the openings 102 in the housings 20. The connecting members 104 can be connected together by unwinding the cords 82 from their respective spools 80 at which time the elastic cords 78 are wound on their respective spools 76. The headlamps are then adjusted to obtain the desired readings on the dials 108 and the spirit levels 116 of both of the units 16 and 18. The connector members 104 are then disconnected and the cords 82 will be automatically rewound on their respective spools 80 by the action of the elastic cords 78 on the spools 70. The units 16 and 18 can then be removed from the headlamps and the operation is completed.

I have illustrated and described what I now consider to be the preferred embodiments of the invention. It is to be understood, however, that various changes may be made in the apparatus without departing from the broader scope of the invention which is defined by the following claims.

I claim:

1. In apparatus for testing automobile headlamps, an elongated housing having a generally circular base portion, means for clamping said base portion to the periphery of a headlamp with the longitudinal axis of the housing oriented with respect to the beam of the headlamp, a self-winding reel in said housing, a flexible cord wound on said reel, a fixed cord guide in said housing, a spindle having a fixed axis in said housing, a deflection member mounted on said spindle for pivotal movement about the fixed axis thereof, said deflection member having a restricted throat spaced from the axis of said spindle, said flexible cord extending from said reel, around said cord guide, and through said restricted throat to the exterior of said housing whereby said deflection member pivots about said spindle upon changes in direction of said cord exteriorly of said housing, a pointer movable with said deflection member, and a stationary scale associated with said pointer for indicating the direction of said cord relative to the longitudinal axis of said housing.

2. In apparatus for testing automobile headlamps, an elongated housing having a generally circular base portion, means for clamping said base portion to the periphery of a headlamp with the longitudinal axis of the housing oriented with respect to the beam of the headlamp, a fixed cord guide in said housing, a spindle having a fixed axis in said housing, said cord guide and the axis of said spindle lying in a plane normal to said longitudinal axis of said housing, a deflection member mounted on said spindle for pivotal movement about the axis thereof, said deflection member having a restricted throat spaced from the axis of said spindle, an elastic cord extending from said cord guide and through said restricted throat to the exterior of said housing whereby said deflection member pivots about said spindle upon changes in direction of said cord exteriorly of said housing, a pointer movable with said deflection member, and a stationary scale associated with said pointer for indicating the direction of said cord relative to the longitudinal axis of said housing.

3. In apparatus for testing automobile headlamps, an elongated body having a base portion, means for clamping said base portion to the periphery of a headlamp with the longitudinal axis of the body extending forwardly from the headlamp, a fixed cord guide on said body, a spindle having a fixed axis on said body, said cord guide and the axis of said spindle lying in a plane normal to said longitudinal axis of said body, a deflection member mounted on said spindle for pivotal movement about the fixed axis thereof, said deflection member having a restricted throat spaced from the axis of said spindle, a flexible cord extending from said cord guide and through said restricted throat whereby said deflection member pivots about said spindle upon changes in direction of said cord, a pointer movable with said deflection member, and a stationary scale associated with said pointer for indicating the direction of said cord relative to the longitudinal axis of said body.

4. In apparatus for testing automobile headlamps, an elongated housing having a generally circular base portion, means for clamping said base portion to the periphery of a headlamp with the longitudinal axis of the housing oriented with respect to the beam of the headlamp, a self-winding reel in said housing, a flexible cord wound on said reel, a fixed cord guide in said housing, a fixed spindle in said housing, said cord guide and spindle lying in a plane normal to said longitudinal axis of said housing, a deflection member pivotally mounted on said spindle, said deflection member having a restricted throat spaced from the axis of said spindle, said flexible cord extending from said reel, around said cord guide, and through said restricted throat to the exterior of said housing whereby said deflection member pivots about said spindle upon changes in direction of said cord exteriorly of said housing, a pointer movable with said deflection member, and a stationary scale associated with said pointer for indicating the direction of said cord relative to the longitudinal axis of said housing.

5. In automobile headlamp testing apparatus, a housing having a base portion of generally circular configuration, a plurality of clamping jaws loosely supported in circumferentially spaced positions around said base portion, said base portion having rearwardly facing surfaces thereon for engaging a headlamp and, when so engaged, causing said housing to assume a position oriented with respect to the beam of the headlamp, first spring means urging said jaws into clamping engagement with the periphery of the headlamp to support said housing on the headlamp, second spring means urging said housing toward the headlamp to position said rearwardly facing surfaces in the aforesaid engagement with the headlamp, lever means for expanding said clamping jaws against the action of said spring means, and means in said housing for determining the direction of the housing relative to the longitudinal axis of the automobile.

6. Apparatus for testing the adjustment of a pair of automobile headlamps, such apparatus comprising a pair of housings, each of which is provided with a base portion of generally circular configuration, a plurality of clamping jaws loosely supported in circumferentially spaced positions around each of said base portions, each of said base portions having rearwardly facing surfaces thereon for engaging a headlamp, and when so engaged, causing the housing to assume a position parallel to the beam of the headlamp, each of said housings being provided with first spring means urging said jaws into clamping engagement with the periphery of the headlamp to support the housing on the headlamp, each of said housings being provided with second spring means urging the housing toward the headlamp to position said rearwardly facing surfaces in the aforesaid engagement with the headlamp, a spirit level in said housing for indicating the inclination of the beam of the headlamp relative to the longitudinal axis of the automobile, a flexible cord extending from the forward end of one housing to the forward end of the other housing, and means within each housing responsive to the direction of said cord for indicating the lateral deviation of the beam of the headlamp relative to the longitudinal axis of the automobile.

7. In automobile headlamp testing apparatus, a housing having a base portion of generally circular configuration, a plurality of clamping jaws loosely supported in circumferentially spaced positions around said base portion, said base portion having rearwardly facing surfaces thereon for engaging a headlamp and, when so engaged, causing said housing to assume a position oriented with respect to the beam of the headlamp, first spring means urging said jaws into clamping engagement with the periphery of the headlamp to support said housing on the headlamp, second spring means urging said housing toward the headlamp to position said rearwardly facing surfaces in the aforesaid engagement with the headlamp, and a spirit level in said housing for determining the inclination of the housing relative to the longitudinal axis of the automobile.

8. In automobile headlamp testing apparatus, a housing having a base portion of generally circular configuration, a plurality of clamping jaws loosely supported in circumferentially spaced positions around said base portion, said base portion having rearwardly facing surfaces thereon for engaging a headlamp and, when so engaged, causing said housing to assume a position oriented with respect to the beam of the headlamp, first spring means urging said jaws into clamping engagement with the periphery of the headlamp to support said housing on the headlamp, second spring means urging said housing toward the headlamp to position said rearwardly facing surfaces in the aforesaid engagement with the headlamp, and means in said housing for determining the direction of the housing relative to the longitudinal axis of the automobile.

9. In apparatus for testing an automobile headlamp of the sealed beam type having reference surfaces thereon lying in a plane perpendicular to the axis of the beam of the headlamp, a housing having a base portion of generally circular configuration, a plurality of clamping jaws loosely supported in circumferentially spaced positions around said base portion, said base portion having rearwardly facing surfaces thereon for engaging the reference surfaces of the headlamp and, when so engaged, causing said housing to assume a position oriented with respect to the beam of the headlamp, first spring means urging said jaws into clamping engagement with the periphery of the headlamp to support said housing on the headlamp, second spring means urging said housing toward the headlamp to position said rearwardly facing surfaces in the aforesaid engagement with the reference surfaces of the headlamp, and means in said housing for determining the direction of the housing relative to the longitudinal axis of the automobile.

10. Apparatus for testing the adjustment of a pair of automobile headlamps, such apparatus comprising a pair of elongated housings each of which is provided with a base portion of generally circular configuration, means for clamping said base portions to the peripheries of the headlamps to support the housings on the headlamps with the longitudinal axis of each housing parallel to the beam of the headlamp to which it is clamped, a self-rewinding reel within each housing, a flexible cord having its opposite ends wound on said reels, a fixed cord guide in each housing, a deflection member pivotally mounted on a fixed axis within each housing, said fixed cord guide and said fixed axis in each housing lying in a plane normal to the longitudinal axis of the surrounding housing, said flexible cord extending from the reel in each housing around said fixed cord guides and through a restricted throat in each deflection member, said throat in each deflection member being spaced from the fixed axis of such deflection member whereby said deflection members will pivot about their fixed axes on changes in the direction of said cord, a pointer movable with each deflection member, and a stationary scale associated with each pointer for indicating the deviation of said cord from the plane normal to the longitudinal axis of the associated housing.

11. In automobile headlamp testing apparatus, a body having a base portion, a plurality of clamping jaws loosely supported by said base portion, said base portion having rearwardly facing surfaces thereon for engaging a headlamp and, when so engaged, causing said body to assume a definite position relative to the beam of the headlamp, first spring means urging said jaws into clamping engagement with the periphery of the headlamp to support said body on the headlamp, second spring means urging said body toward the headlamp to position said rearwardly facing surfaces in the aforesaid engagement with the headlamp, and means on said body for indicating the direction of the beam of the headlamp relative to the longitudinal axis of the automobile.

12. In apparatus for testing adjustment of automobile headlamps, an elongated body having a base portion, means for securing said base portion to a headlamp with the longitudinal axis of said body extending forwardly from the headlamp, a fixed cord guide on said body, a deflection member pivotally mounted on said body, said deflection member having a restricted aperture therein, the pivotal axis of said deflection member being positioned between said restricted aperture and said fixed cord guide, a flexible cord extending from said fixed cord guide through said restricted aperture whereby said deflection member pivots relative to said body upon changes in direction of said cord relative to the longitudinal axis of said body, a pointer carried by said deflection member, and a scale fixed to said body upon which said pointer indicates the direction of said cord relative to the longitudinal axis of said body.

13. Apparatus for ascertaining the inclination from the horizontal of a surface on which an automobile is standing, comprising a pair of standards of equal vertical height, each of said standards being provided with a thin edged horizontally extending hook-like portion for positioning on such surface with the hook-like portion of one standard engaging the forward end of that portion of a front tire of the automobile which is in engagement with such surface and with the hook-like portion of the other standard engaging the rearward end of that portion of a rear tire which is in engagement with such surface, a spirit level pivotally mounted on the upper end of one of said standards, a flexible, elastic cord connected to the upper end of the other of said standards, said cord being connected to said spirit level at a point spaced from it pivotal connection to its supporting standard to thereby cause said spirit level to assume a position parallel to such surface.

14. In automobile headlamp testing apparatus, a housing having a base portion of generally circular configuration, a plurality of clamping jaws loosely supported in circumferentially spaced positions around said base portion, said base portion having rearwardly facing surfaces thereon for engaging a headlamp and, when so engaged, causing said housing to assume a position oriented with respect to the beam of the headlamp, first spring means urging said jaws into clamping engagement with the periphery of the headlamp to support said housing on the headlamp, second spring means urging said housing toward the headlamp to position said rearwardly facing surfaces in the aforesaid engagement with the headlamp, a spirit level in said housing for indicating the inclination of the housing from the horizontal, and means for raising one end of said spirit level relative to the other end thereof to compensate for inclination from the horizontal of the surface on which the automobile is standing.

References Cited in the file of this patent

UNITED STATES PATENTS

| Number | Name | Date |
|---|---|---|
| 508,294 | Famous | Nov. 7, 1893 |
| 2,144,838 | Falge | Jan. 24, 1939 |
| 2,557,893 | Russell et al. | June 19, 1951 |
| 2,598,794 | Holmes | June 3, 1952 |
| 2,609,611 | Dickson | Sept. 9, 1952 |